US010252126B2

(12) United States Patent
Paquette et al.

(10) Patent No.: US 10,252,126 B2
(45) Date of Patent: Apr. 9, 2019

(54) LACROSSE HEAD AND RELATED METHOD OF MANUFACTURE (71) Applicant: Warrior Sports, Inc., Warren, MI (US)

(72) Inventors: Adam D. Paquette, Royal Oak, MI (US); Richard J. Janisse, Windsor (CA)

(73) Assignee: Warrior Sports, Inc., Warren, MI (US)

(*) Notice: Subject to any disclaimer, the term of this patent is extended or adjusted under 35 U.S.C. 154(b) by 8 days.

(21) Appl. No.: 15/340,315

(22) Filed: Nov. 1, 2016

(65) Prior Publication Data
US 2017/0189772 A1 Jul. 6, 2017

Related U.S. Application Data (60) Provisional application No. 62/274,517, filed on Jan. 4, 2016.

(51) Int. Cl.
A63B 59/20 (2015.01)
B29C 45/33 (2006.01)
B29L 31/52 (2006.01)
B29K 101/12 (2006.01)

(52) U.S. Cl.
CPC ............. A63B 59/20 (2015.10); B29C 45/33 (2013.01); B29K 2101/12 (2013.01); B29L 2031/52 (2013.01)

(58) Field of Classification Search
CPC ................ A63B 59/20; B29C 45/2628; B29K 2102/12; B29L 2031/52
See application file for complete search history.

(56) References Cited

U.S. PATENT DOCUMENTS

| 2,039,138 A | * | 4/1936 | Auer | A63B 59/20 473/513 |
| 2,142,527 A | * | 1/1939 | Pool | A63B 59/20 473/513 |
| 3,507,495 A | | 4/1970 | Tucker et al. | |
| 4,034,984 A | | 7/1977 | Crawford et al. | |
| 4,097,046 A | | 6/1978 | Friant | |
| 4,138,111 A | | 2/1979 | Rule | |
| 4,358,117 A | | 11/1982 | Deutsch | |
| 4,657,260 A | * | 4/1987 | Brine, Jr. | A63B 59/20 473/513 |

(Continued)

Primary Examiner — Alvin A Hunter
Assistant Examiner — Amir A Klayman
(74) Attorney, Agent, or Firm — Warner Norcross + Judd LLP (57) ABSTRACT A lacrosse head having string holes and/or sidewall openings that are offset at an angle relative to a longitudinal axis of the lacrosse head, and a related method of manufacture, are provided. The lacrosse head includes a pair of sidewalls extending from the base and joined with one another distal from the base at the scoop. A longitudinal axis can extend from the base toward the scoop. The sidewalls can define string holes, each having a string hole axis disposed at a non-perpendicular angle relative to the longitudinal axis, optionally 5° to 75°, further optionally 25° to 35°, and even further optionally 30°. The sidewalls can define one or more sidewall openings each having a sidewall opening axis disposed at a non-perpendicular angle relative to the longitudinal axis, such as those noted above. A related method of manufacture also is provided.

20 Claims, 8 Drawing Sheets (56) References Cited

U.S. PATENT DOCUMENTS

| | | | | |
|---|---|---|---|---|
| 5,037,112 | A * | 8/1991 | Brine, III | A63B 59/20 473/513 |
| 5,082,290 | A | 1/1992 | Tucker et al. | |
| 5,178,397 | A | 1/1993 | Brine, Jr. | |
| 5,494,297 | A * | 2/1996 | MacNeil | A63B 59/20 473/513 |
| 5,566,947 | A | 10/1996 | Tucker et al. | |
| 5,674,140 | A | 10/1997 | Tucker et al. | |
| 5,897,889 | A * | 4/1999 | Shao | B29C 45/2628 425/577 |
| 5,957,791 | A | 9/1999 | Nicholas et al. | |
| 6,852,047 | B2 | 2/2005 | Tucker, Sr. | |
| 7,727,093 | B2 * | 6/2010 | Lamson | A63B 59/20 473/513 |
| 8,029,390 | B2 * | 10/2011 | Winningham | A63B 59/20 473/513 |
| 8,267,813 | B2 * | 9/2012 | Vestuti | A63B 59/20 473/513 |
| 8,282,512 | B1 * | 10/2012 | Winningham | A63B 59/20 473/513 |
| 2001/0040309 | A1 * | 11/2001 | Hong | B29C 45/2628 264/219 |
| 2004/0082412 | A1 * | 4/2004 | Tucker, Sr. | A63B 59/20 473/513 |
| 2007/0054760 | A1 * | 3/2007 | Gait | A63B 59/20 473/513 |
| 2007/0060423 | A1 * | 3/2007 | Morrow | A63B 59/20 473/513 |
| 2009/0111618 | A1 * | 4/2009 | Schmidt | A63B 59/20 473/513 |
| 2010/0075785 | A1 * | 3/2010 | Winningham | A63B 59/20 473/513 |
| 2010/0113191 | A1 * | 5/2010 | Winningham | A63B 59/20 473/513 |
| 2010/0190590 | A1 * | 7/2010 | Sobel | A63B 59/20 473/513 |
| 2012/0302382 | A1 * | 11/2012 | Bond | A63B 59/02 473/513 |
| 2014/0103566 | A1 * | 4/2014 | Janisse | B29C 70/688 264/161 |
| 2016/0166900 | A1 * | 6/2016 | Colchie | A63B 59/20 473/513 |

* cited by examiner

LACROSSE HEAD AND RELATED METHOD OF MANUFACTURE

BACKGROUND OF THE INVENTION

The present invention relates to lacrosse heads, and more particularly to lacrosse heads having string holes and/or sidewall openings that are offset at an angle relative to a longitudinal axis of the lacrosse head, and a related method of manufacture.

Figure 1:
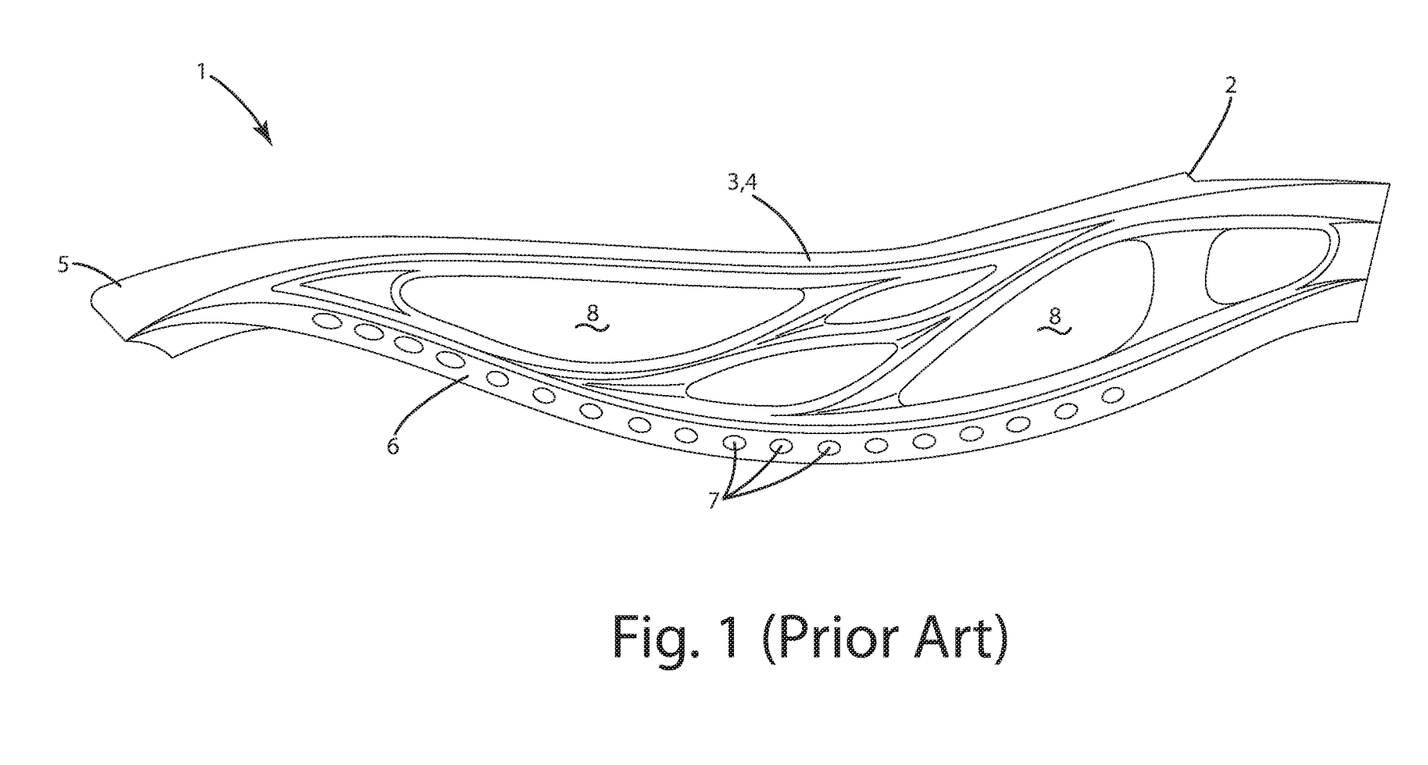
FIG. 1 is a side view of a prior art lacrosse head.

Conventional lacrosse heads typically are constructed from plastic, and as shown in FIG. 1, include an open frame 1 having a ball stop 2, a pair of sidewalls 3, 4 that diverge from the ball stop and a scoop 5 that connects the sidewalls, opposite the ball stop. The sidewalls include a lower rail 6 that defines multiple circular or elliptical string holes 7. A lacrosse pocket is strung to the lower rail via the string holes, around the back side of the frame, leaving the opposing side of the frame open for catching or shooting a lacrosse ball.

Many conventional lacrosse heads are constructed to be light and maneuverable. Typically, this is accomplished by reducing or eliminating material from the head. Many times, the sidewalls define sidewall openings 8 to achieve the weight reduction.

Figure 2:
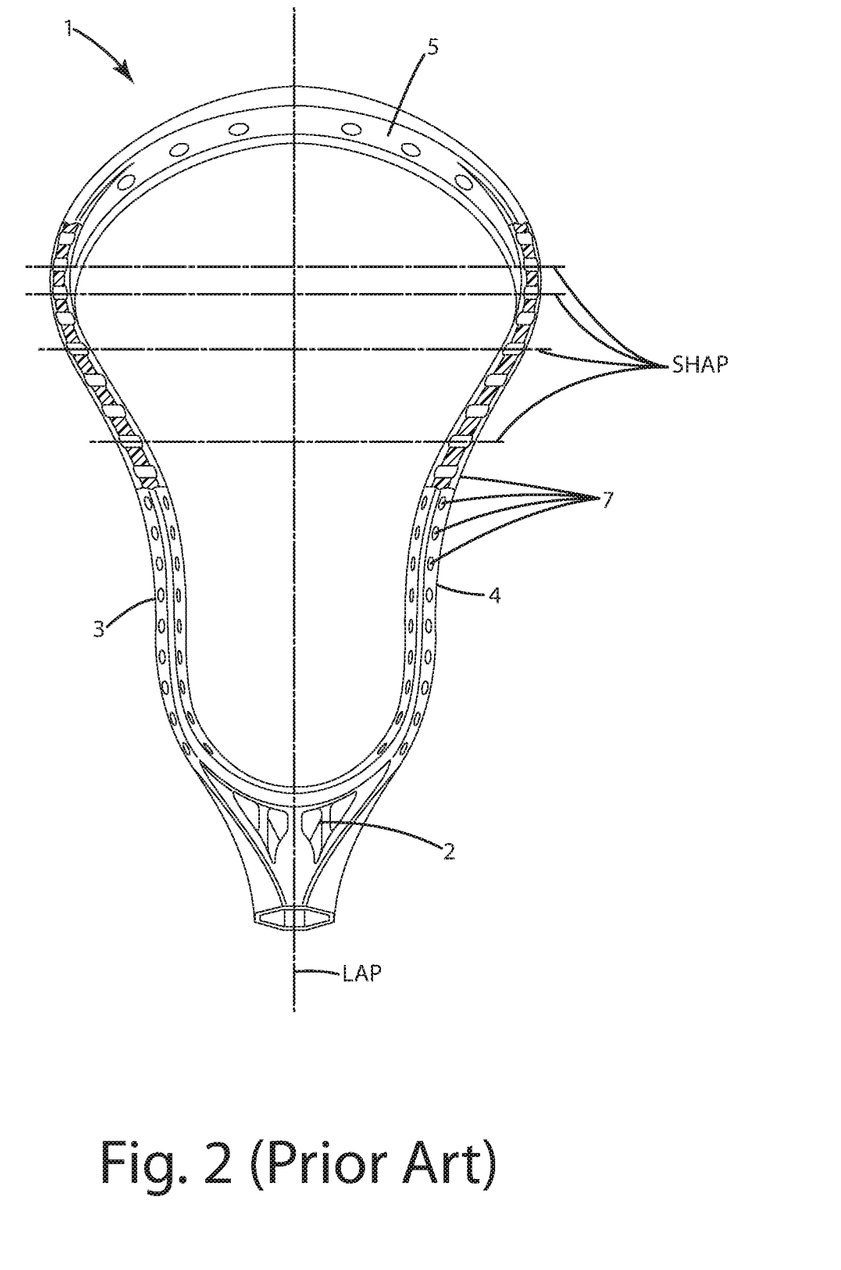
FIG. 2 is a top view of the prior art lacrosse head.
Figure 3:
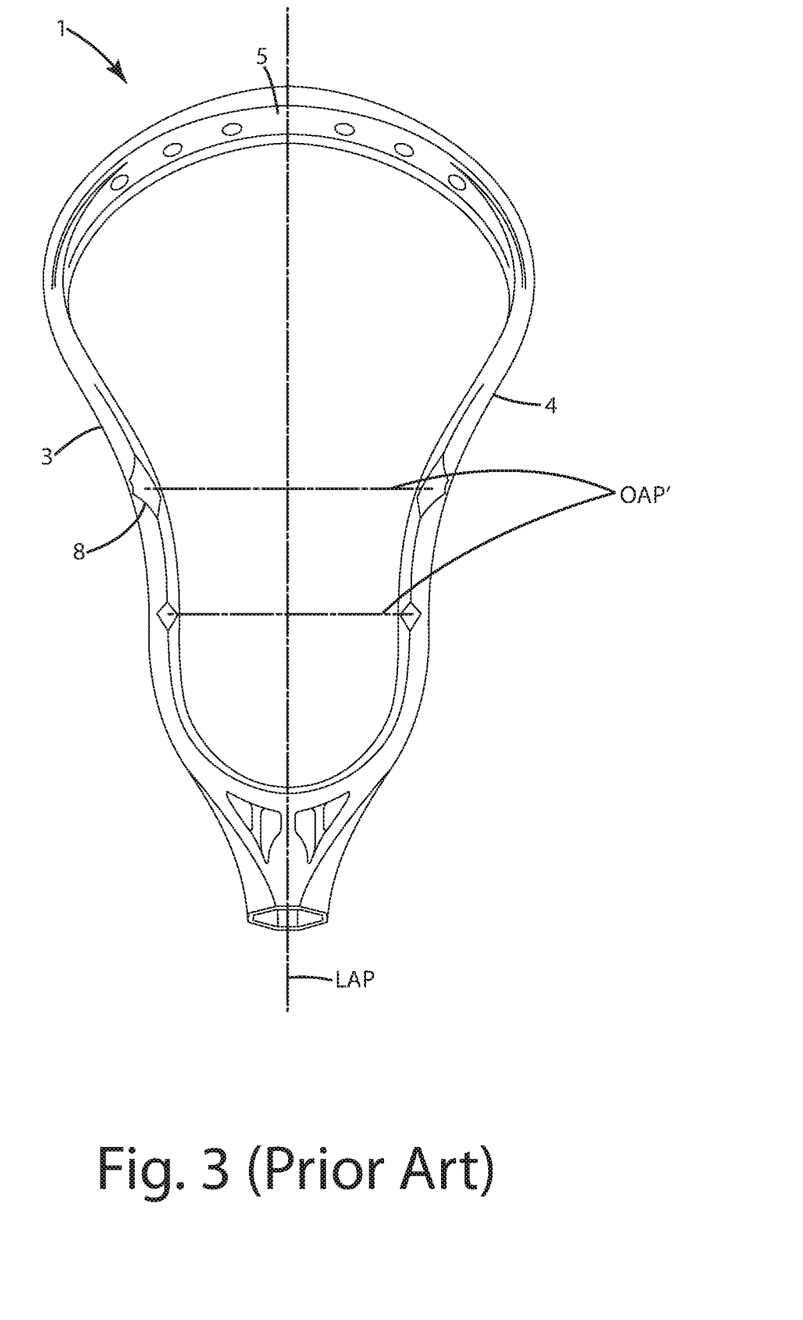
FIG. 3 is another top view of the prior art lacrosse head.

In many conventional lacrosse heads, the string holes 7 are oriented to point or extend directly toward the longitudinal axis LAP of the head. This is illustrated in FIG. 2, where the string hole axis SHAP, extend toward and perpendicularly intersect the longitudinal axis LAP of the lacrosse head. Likewise, opening holes 8 typically are oriented to point directly at the longitudinal axis LAP. As shown in FIG. 3, the opening hole axis OAP, extend toward and perpendicularly intersect the longitudinal axis LAP.

Lacrosse heads having string holes and sidewall openings that are perpendicular to the longitudinal axis of the head can limit the pocket stringing configurations as well as reduce the structural integrity of the head. For example, with the string holes axis oriented perpendicular to the longitudinal axis of the head, laces of a pocket strung through those string holes can be predisposed to tension along directions perpendicular to the lacrosse head axis. In some cases, this can cause undesirable rebound of the pocket and/or can alter the path of a lacrosse ball as it enters and/or exits the pocket.

Accordingly, there remains room for improvement in lacrosse head constructions in connection with string holes, sidewall openings and other openings.

SUMMARY OF THE INVENTION

A lacrosse head having string holes and/or sidewall openings that are offset at an angle relative to a longitudinal axis of the lacrosse head, and a related method of manufacture, are provided via the current embodiments.

In one embodiment, the lacrosse head includes a pair of sidewalls extending from the base and joined with one another distal from the base at the scoop. Each sidewall optionally can include an upper rail and a lower rail separated from one another by a distance, and a cross member joined with the upper rail and the lower rail. A longitudinal axis can extend from the base toward the scoop.

In another embodiment, the lower rail can define one or more string holes, each having a string hole axis. The string hole axis of each string hole can be disposed at a first non-perpendicular angle relative to the longitudinal axis of the lacrosse head.

In still another embodiment, each of the string holes can be bounded by at least one string hole wall. Each of the string hole walls can be parallel to each of the respective string hole axis, and optionally parallel to one another.

In yet another embodiment, the longitudinal axis of the lacrosse head bisects the lacrosse head into symmetric left and right sides. The first non-perpendicular angle can be an offset angle of optionally 5° to 50°, further optionally 25° to 45°, and even further optionally about 30°.

In even another embodiment, one or more of the sidewalls can be of an open frame construction. In such a case, one or more sidewalls can define sidewall openings which can be bounded by one or more of the cross member, the upper and/or lower rails. The sidewall opening can include a sidewall opening axis. This sidewall opening axis can be disposed at a second non-perpendicular angle relative to the longitudinal axis of the lacrosse head. The second non-perpendicular angle can be an offset angle of optionally 5° to 50°, further optionally 25° to 45°, and even further optionally about 30°.

In a further embodiment, each sidewall can define multiple string holes in at least one of the upper rail in the lower rail. Each of the plurality of string holes can include a respective string hole axis disposed at the first non-perpendicular angle relative to the longitudinal axis of the lacrosse head.

In still a further embodiment, the sidewall opening axis can be perpendicular to, or offset at an angle relative to one another and/or the longitudinal axis of the lacrosse head.

In an even further embodiment, a method is provided. The method can include: providing a lacrosse head mold cavity defining a base cavity, a scoop cavity, and at least one sidewall cavity in fluid communication with one another; providing a mold slide including a plurality of projections adapted to selectively extend into and withdraw from a sidewall cavity along a slide axis; introducing liquid material into the mold cavity so that it is dispersed in the base cavity, the scoop cavity and the at least one sidewall cavity; allowing the liquid material to cure to form a lacrosse head including a base, a scoop and at least one sidewall; and withdrawing the mold slide along the slide axis so as to form at least one of a sidewall opening and a string hole in the at least one sidewall where the plurality of projections were previously located. Optionally, the slide axis is at a non-perpendicular angle relative to a longitudinal axis of the lacrosse head mold cavity.

The current embodiments of a lacrosse head having uniquely formed openings where the openings are string holes, those string holes can be angled a non-perpendicular angle relative to the longitudinal axis of the lacrosse head. In turn, strings strung to a pocket through these non-perpendicularly angled string holes can create an optional V-shaped ball channel to assist in better guiding a lacrosse ball shot from the lacrosse head. The strings strung to a pocket through slanted string holes also can provide tension along the strings in a direction that is not perpendicular to the longitudinal axis of the lacrosse head, and that does not extend straight across the lacrosse head. In turn, the tension in the strung strings of the pocket therefore can be selectively varied to enhance ball control and shooting capabilities with the head. Where the sidewalls include sidewall openings having sidewall opening axis that are slanted relative to the longitudinal axis of the lacrosse head, those openings can be utilized to enhance rigidity to certain portions of the lacrosse head structure and/or to selectively provide flexibility in other regions.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

A current embodiment of the lacrosse head is illustrated in FIGS. 4-9, and generally designated 10. The lacrosse head 10 includes a throat 11 to connect the head to a lacrosse handle (not shown), a pair of opposing sidewalls 21, 22 and a scoop 30 connecting the pair of opposing sidewalls opposite the throat 11. Located at the lower end of the head, adjacent the throat 11 is a base 50 which includes a ball stop 52. The lacrosse head can define a longitudinal axis LA that extends from the base toward the scoop. The longitudinal axis can generally bisect the head into left and right mirror portions of one another along the longest length of the head.

The sidewalls can be of an open frame construction, that is then they can define at least one non-string hole, also referred to as a sidewall opening, that extends completely through the sidewalls, from the interior to the exterior, where the sidewall opening reduces the weight of the head. Exemplary non-string holes are the sidewall openings 41-44 shown in FIG. 6. These sidewall openings can include sidewall opening axis SOA (FIG. 9) that are disposed at a non-perpendicular angle relative to the longitudinal axis LA of the head. This sidewall opening axis SOA can be forwardly slanted relative to that longitudinal axis LA. Of course, they may be rearwardly slanted in other applications.

The sidewalls, ball stop and scoop can wrap around and form a periphery of the interior 13 of the head. The interior of the head can optionally be that portion and surface of the head that can directly contact the ball while the ball is being carried in or shot by the head. Each sidewall can include an upper rail 60 and a lower rail 70. One or more cross members 30 can be joined with the upper rail and a lower rail, generally extending from one to the other adjacent one or more of the sidewall openings 41-44.

One or more of the upper rail, lower rail and/or cross members can define string holes 80 that are configured to receive laces, strings or other elongated members therethrough and attach a pocket to the lacrosse head 10. These string holes 80 can include string hole axis SHA (FIGS. 7, 8) that are disposed at a non-perpendicular angle relative to the longitudinal axis LA of the head. This string hole axis SHA can generally be forwardly slanted relative to that longitudinal axis LA. Of course, they may be rearwardly slanted in other applications.

The construction of the exemplary head 10 will now be described in more detail with reference to FIGS. 4-9. As shown, the throat 11 can extend from the base 50 and can define a socket S. The socket S can be tubular in shape and can define a cavity to receive a handle (not shown). Alternatively, the throat 11 can include a projection which is adapted to fit within a handle (not shown). The handle can be secured to socket S, optionally via a fastener (not shown) such as a screw, peg or other fastening device or material, such as an adhesive, cement or glue. Optionally, the throat 11 and/or socket S can define apertures or holes as shown to reduce the weight of the head 10.

The head 10 includes sidewalls 21, 22 that generally are positioned on opposite sides of a longitudinal axis LA of the head, which optionally can bisect the head into opposing halves. The longitudinal LA extends from the ball stop 52 and/or base 50 toward the scoop 40. A plane P can be established through the longitudinal axis LA. For example, the plane P can extend perpendicular to the plane of FIG. 4 and can intersect the longitudinal axis LA along its length. One or both of the sidewalls can extend from the ball stop 52 toward the scoop 40 which is located at the opposite end of the head 10.

Figures 7, 8:
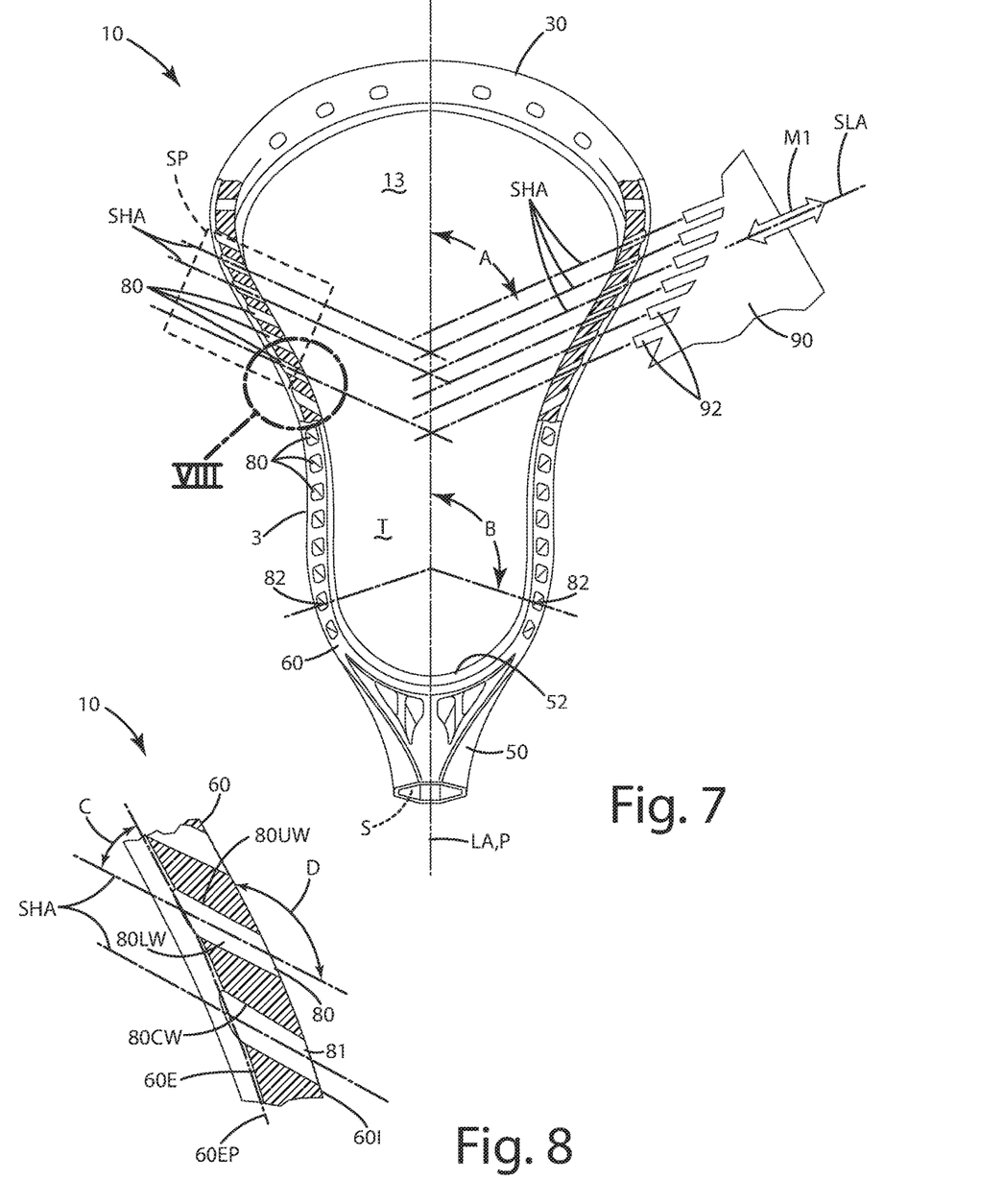
FIG. 7 is a top view of the lacrosse head of the current embodiment illustrating the slanted string holes.
FIG. 8 is a close up view taken from view VII in FIG. 7.

Each sidewall can include an upper rail 60 and a lower rail 70. These rails can be secured to an extent between the base 50 and the scoop 30. Alternatively, the upper and lower rails can be an extension of the base 50. Referring to FIG. 7, the upper rails 60, lower rails 70 and the sidewalls 20 can follow an outward curvilinear path near the base 50 before extending generally parallel to the longitudinal axis LA, generally within the throat T. The throat T can generally extend from a ball stop 50 about ½ to ⅔ the length of the interior 13, of the head or other distance as desired.

The upper and lower rails 60, 70 can include an exterior surface 60E and 70E, respectively, located generally opposite the interior 13 of the head. The exterior surfaces can form part of an exterior of the head, which generally is not configured to contact the ball as it is held or shot from the head. These exterior surfaces can be of a partial circular, polygonal, elliptical, rectangular or beveled cross section that are generally uniform or vary as these surfaces extend from the base 50 to the scoop 30. The upper and lower rail 60, 70 can further include interior surfaces 601 and 701, respectively located within the interior 13 of the head. These interior surfaces can extend across various components of the sidewall on the interior, for example the rails as illustrated and/or the cross members of the sidewalls.

Figure 4:
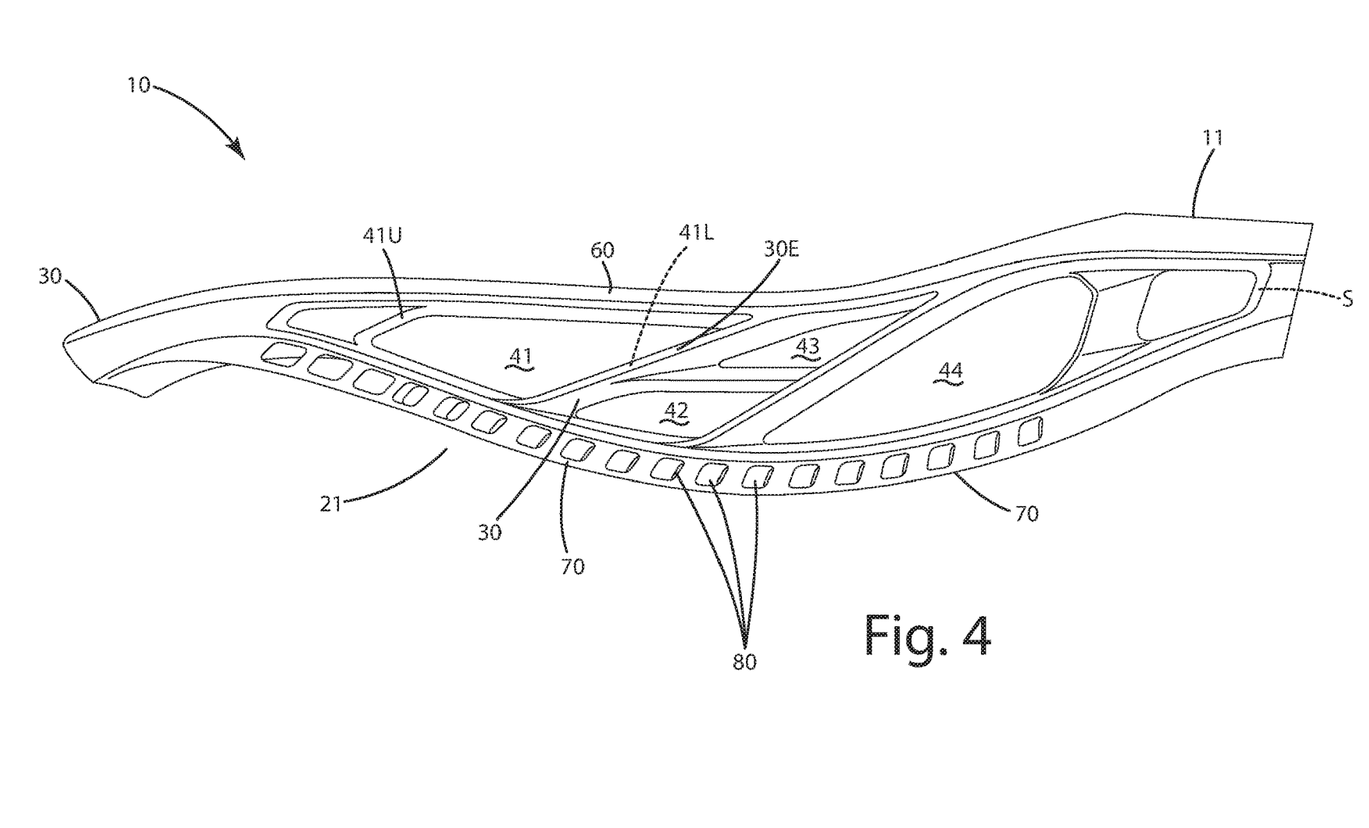
FIG. 4 is a side view of the a lacrosse head of a current embodiment including slanted string holes and sidewall openings.
Figure 5:
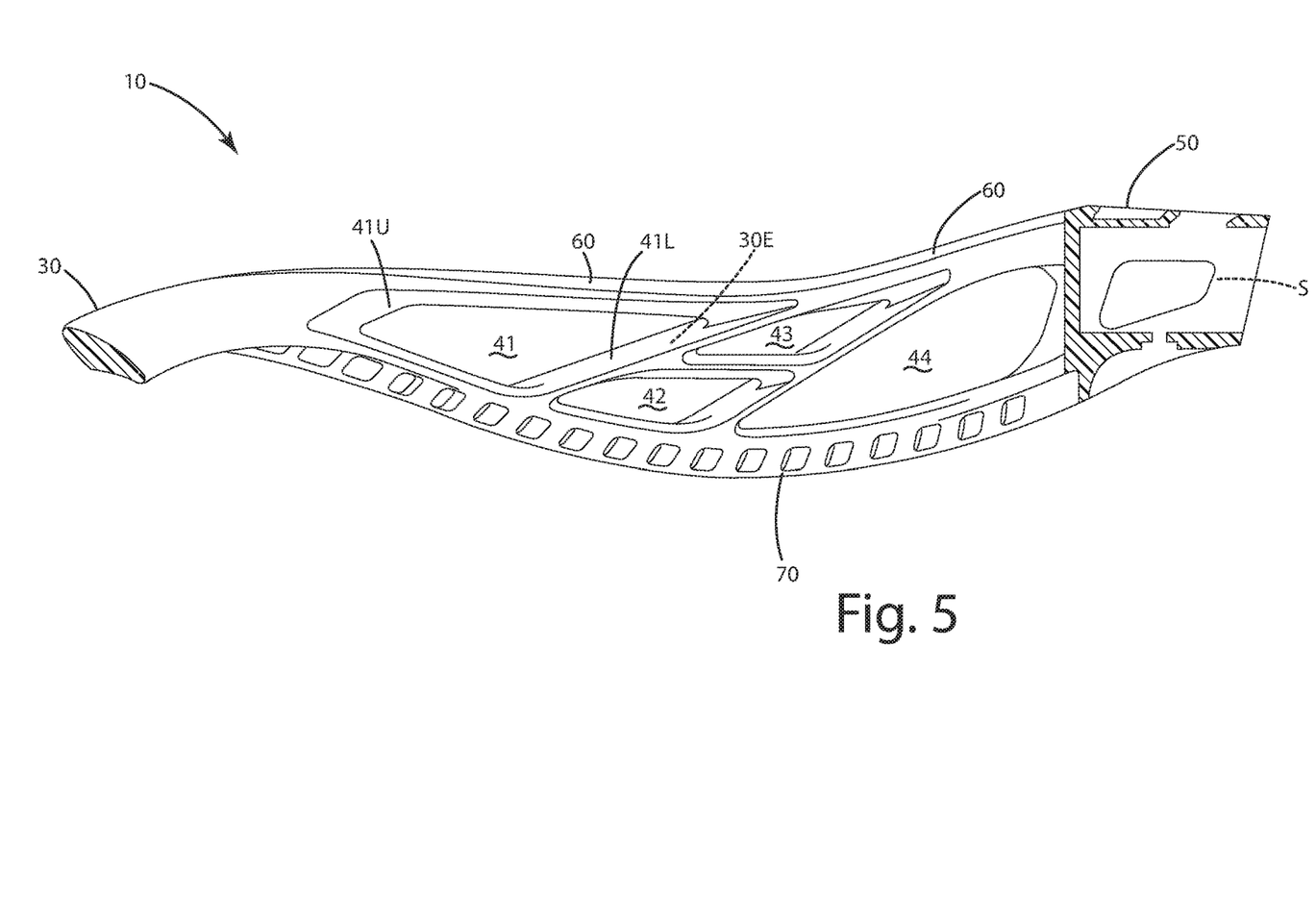
FIG. 5 is a section view of the lacrosse head of the current embodiment including slanted string holes and sidewall openings.
Figure 9:
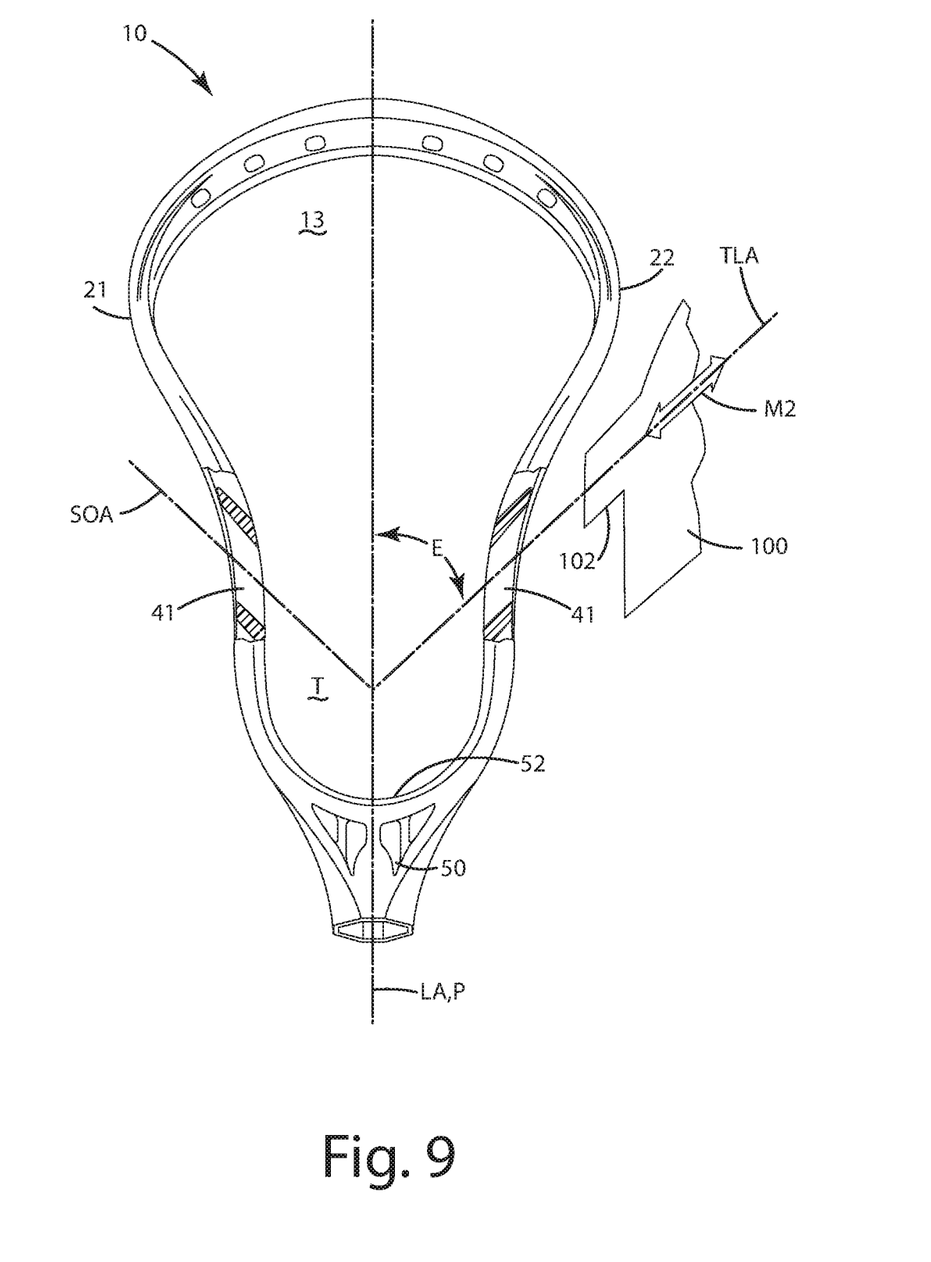
FIG. 9 is a top view of the lacrosse head of the current embodiment illustrating the slanted sidewall openings.

As shown in FIGS. 4, 5 and 9, the sidewalls 21, 22 can be of an open frame construction, defining one or more non-string apertures or sidewall openings 41-44 between the upper and lower rails 60, 70. These apertures can be of any preselected shape and can be configured for structural purposes as desired. In addition to the sidewall openings, the sidewalls and/or certain components thereof, such as the lower rails 70, can define one or more string holes 80 that allow attachment of a net or pocket (not shown) to the head 10. The precise placement of these string holes can vary as desired. Further, although shown as generally rounded, circular or elliptical holes, these string holes can vary in geometric shape depending on the application. For example, the string holes can be polygonal, rounded or multisided.

Referring to FIGS. 4-5, the sidewalls also can include cross members 30 that can extend between and be joined with the upper rail 60 and the lower rail 70. The cross members 30 each can include a first end and a second end that join with the respective upper 60 and lower 70 rails. As illustrated, the cross members 30 can be relatively straight and can extend at an angle relative to the upper and lower rails. In other embodiments, the cross members can be curved or angled in so extending between the upper and lower rails.

Figure 6:
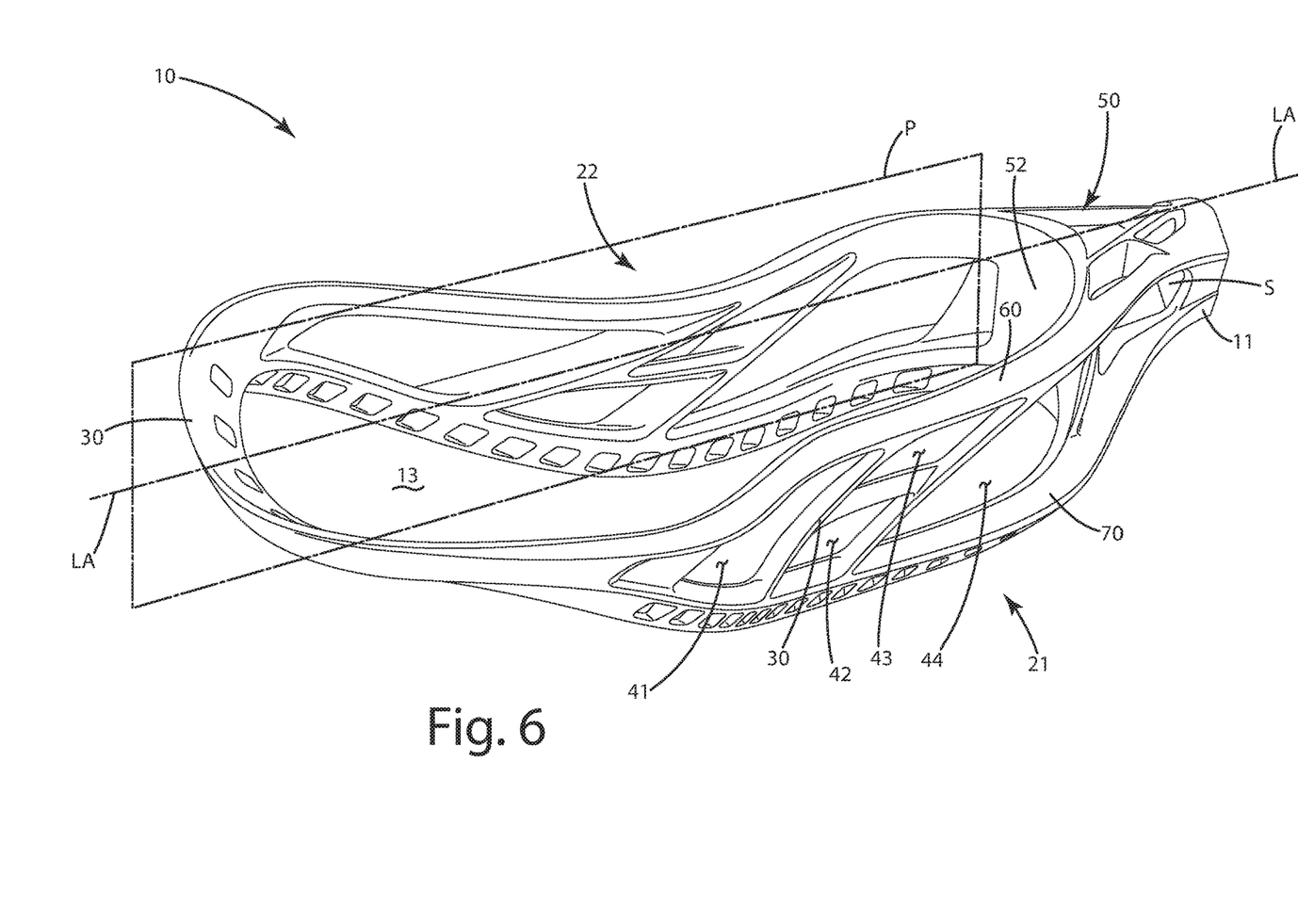
FIG. 6 is a perspective view of the lacrosse head of the current embodiment including slanted string holes and sidewall openings.

Referring to FIGS. 7 and 8, the string hole openings 80 will be described in more detail. As shown there, the string holes define respective string hole axis SHA. The string hole axis SHA, as shown in FIG. 7, are generally parallel to one another, extend from the string hole openings 80 and traverse the longitudinal axis LA and/or the plane P of the lacrosse head 10 at a first non-perpendicular angle A. This angle can be optionally 5° to 75°, further optionally 25° to 55°, even further optionally 5° to 50°, yet further optionally 25° to 45°, still yet further optionally about 30° relative to the longitudinal axis LA and/or the plane P. In other embodiments, this angle can be optionally about 5°, 10°, 15°, 20°, 25°, 30°, 35°, 40°, 45°, 50°, 55°, 60°, 65°, 70° or the like. In this configuration, the string hole axis SHA can be considered to be slanted relative to the longitudinal axis LA or offset at some non-perpendicular and/or non-right angle relative to the longitudinal axis LA. Optionally, the string hole axis SHA can be disposed in one or more string hole planes SP that are each optionally about perpendicular to the plane P, and the string hole axis SHA themselves can be angled at a slanted angle A relative to the plane P when viewed from a top view as shown in FIG. 7. Further optionally, as shown in FIG. 6, the string hole axis SHA can be perpendicular to the plane P when viewed from a throat-to-scoop view. Even further optionally, the string hole axis can be fixed, that is, not movable relative to the sidewalls, the longitudinal axis LA and/or plane P.

As further shown in FIG. 8, the string holes 80 can extend from an exterior surface 60E to an interior surface 601 of a portion of the sidewall, for example, the lower rail 60. Of course, these string holes 80 can be defined in the upper rail 60, cross members, or other components of the lacrosse head depending on the application. The exterior surface 60E can define an exterior surface plane 60EP within which the string holes 80 are generally defined. As illustrated, this exterior plane 60EP can be disposed at an angle C relative to the respective string hole axis SHA. This angle C can be equal to the angle A and its values as defined above. In other cases, this angle C can be unequal to the angle A above the throat T but short of the scoop 30, in the region where the sidewalls flare out, away from the longitudinal axis LA or plane P. In this region, the angle C can be less than the angle A. For example, where angle A is about 30°, angle C can be about 10° to 20° in this region. As another example, where angle A is about 40°, angle C can be about 20° to 30° in this region. As yet another example, where angle A is about 50°, angle C can be about 30° to 40° in this region. These values and inequalities can vary depending on the outward curvature of the sidewalls above the throat T and/or the desired string hole axis SHA angles.

As further shown in FIG. 8, each string hole 80 can define one or more string hole walls. As an example, string hole 80 can include a string hole upper wall 80UW and a string hole lower wall 80LW. Where each string hole is generally in the form of a polygon, for example, a square and/or rectangle, one or more walls can be parallel to the respective string hole axis SHA. As another example, where the string hole 81 is in the form of a cylinder with a cylindrical wall 80CW forming its outermost boundary, the string hole axis SHA of that string hole 81 can generally be located in the center of the string hole. Where the string holes optionally are of other geometric shapes, for example elliptical, rounded, triangular or otherwise, the string hole axis generally can be a set of points in the center of the cross-sectional area of the string holes.

As further shown in FIG. 8, the string hole axis SHA can be offset at an angle D relative to the interior wall of the sidewall, for example, the interior surface 601 of the lower rail. This angle D can be complementary to angle C. Alternatively, this angle D can be any pre-selected obtuse or another angle depending on the application in the location of the string hole relative to the base and the scoop.

In some embodiments, it is contemplated that the different string holes will be slanted at different angles relative to the longitudinal axis. For example as shown in FIG. 7, the string holes 80 are disposed at a non-perpendicular angle A relative to the longitudinal axis. In contrast, one or more other string holes 82 that are located near to the base 50 can be disposed at a second angle B relative to the longitudinal axis LA. This second angle B can be different from the angle A. For example, this angle B can be optionally 90° to 120°, further optionally 80° to 100° offset relative to the longitudinal axis LA. As a further example, this angle B can be optionally about 90°, 95°, 100°, 105°, 110°, 115°, 120°, 125°, 130°, or 135°, depending on the application. Further optionally there may be additional sets of string holes that are offset at other various angles relative to the longitudinal axis, where the string holes are different from angles A and/or B.

As shown in FIG. 9, the sidewalls can include sidewall openings 41 having sidewall opening axis SOA that is disposed at a second non-perpendicular or slanted angle E relative to the longitudinal axis LA and/or plane P of the lacrosse head 10. Optionally, in some embodiments, the sidewall opening axis can be disposed at a slanted angle E, while the string hole axis can be disposed at a perpendicular angle relative to the longitudinal axis. In other embodiments, the sidewall opening axis can be disposed at a perpendicular angle relative to the longitudinal axis, while the string hole axis can be disposed at a non-perpendicular slanted angle relative to the longitudinal axis. In yet other embodiments, both the string hole axis and sidewall opening axis can be disposed at first and second non-perpendicular slanted angles, whether equal or not, relative to the longitudinal axis.

Returning to FIG. 9, the sidewall opening 41 can be located generally near the throat T. Of course, it can be located in other areas along the length of the lacrosse head 10. The sidewall opening axis SOA as illustrated can be disposed at the slanted angle E. As mentioned above, this angle E can be the same as angle A if desired. Accordingly this angle E can be optionally 5° to 75°, further optionally 25° to 55°, even further optionally 5° to 50°, yet further optionally 25° to 45°, still yet further optionally about 30° relative to the longitudinal axis LA and/or the plane P. Generally, in this configuration of the sidewall opening axis SOA can be considered to be slanted relative to the longitudinal axis LA or offset at some non-perpendicular and/or non-right angle relative to the longitudinal axis LA.

As shown in FIGS. 4-6, the sidewall opening 41 can be forwardly disposed, with its upper wall 41U angling outward toward the exterior of the sidewall 21. The rearward or lower wall 41L of the sidewall opening can be forwardly slanted so that is obscured by an exterior wall 30E of the cross member 30 in the side view of FIG. 4. Generally the sidewall opening 41 as well as the other sidewall openings 42 and 43 and optionally 44 can be considered undercut in the sidewall 21. In this configuration, the sidewall opening opens generally forwardly, rather than simply outwardly or perpendicular to the longitudinal axis LA.

The lacrosse head and its components can be constructed from a variety of materials such as nylon, urethane, polycarbonate, polyethylene, polypropylene, polyketone, polybutylene terephalate, polypthalamide and/or optionally, any of a variety of polyamides. Other materials such as composites, metals and alloys can be used as well.

A method of making the lacrosse head 10 of the current embodiment is illustrated in FIGS. 7 and 9. Generally, the process can begin with the provision of a lacrosse head mold cavity that mimics the shape of the lacrosse head shown in those figures. The mold cavity can include a scoop cavity, sidewall cavities and the base cavity all in fluid communication with one another. The mold also can include one or more slides 90 and 100, which may or may not be joined with one another and move in unison with one another. As shown in FIG. 7, the mold slide 90 can include multiple projections 92 that are arranged generally parallel to the formed string hole axis SHA of the lacrosse head 10. These projections also can be in the same shape as the desired net shape of the finished string holes 80 of the lacrosse head. These projections and the first mold slide 90 can configure to move in direction M1 along the slide longitudinal axis SLA. This slide longitudinal axis SLA can be disposed generally at the first preselected angle A relative to the longitudinal axis LA and/or the plane P.

When liquid material, for example molten plastic, is injected, poured, or otherwise introduced into the mold cavity, it disperses in the respective base cavity, scoop cavity and sidewall cavities. The projections 92 can be disposed in the sidewall cavities during this step. The material is allowed to cure to form the lacrosse head including a base, a scoop and the sidewalls. The first mold slide 90 is withdrawn along the slide longitudinal axis SLA. In turn, this forms a plurality of string holes in the area or region where the projections 92 were previously located. The formed string holes can include string hole axis SHA that is disposed at a non-perpendicular angle A relative to the longitudinal axis LA and/or the plane P. Additional slides may be used where different types of string holes 82 are to be formed. These can be oriented and can move on different slide longitudinal axis that are different from the slide longitudinal axis SLA described above.

As shown in FIG. 9, another slide 100, which may or may not be joined with the mold slide 90, can be used to form one or more sidewall openings 41 in the sidewalls 21, 22 of the lacrosse head 10 during the manufacturing method. This mold slide 100 generally moves along another slide axis TLA in direction M2 depending on the step. Like the slide mold 90, this sidewall opening slide 100 can include a projection 102 that mimics a desired shape and configuration of a sidewall opening to be formed in the lacrosse head sidewall. This slide mold 100 can be disposed in a sidewall cavity before material is introduced into the mold cavity. The material can be dispersed in the respective base cavity, scoop cavity and sidewall cavities. The material can be allowed to cure to form the base, scoop and sidewalls of the lacrosse head. The slide 100 can be withdrawn along the slide axis TLA so that the sidewall opening 41 is formed in the sidewall where the projection 102 was previously located. The resulting sidewall opening axis can be disposed at a non-perpendicular angle E equal to any of the angles identified for angles A or B above, relative to the longitudinal axis of the lacrosse head mold cavity.

After the lacrosse head is constructed, it can be further processed and/or packaged depending on the application.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A lacrosse head comprising:
   a throat adapted to connect to a lacrosse handle;
   a base joined with the throat, the base including a ball stop, the ball stop extending from an upper ball stop rim to a lower ball stop rim;
   a scoop distal from the base;
   a first sidewall and a second sidewall, each extending from the base toward the scoop and joined with one another distal from the base at the scoop, each first and second sidewall being of an open frame construction defining a sidewall opening, each first and second sidewall including an upper rail and a lower rail and a cross member extending between and joined with the upper rail and the lower rail, and
   a longitudinal axis of the lacrosse head extending from the ball stop toward the scoop,
   wherein the lower rail defines a first plurality of string holes, each string hole of the first plurality of string holes having a string hole axis,
   wherein each string hole axis is disposed to form a first non-perpendicular angle of 5° to 75° relative to the longitudinal axis of the lacrosse head.

2. The lacrosse head of claim 1 comprising a plurality of string hole walls, each bounding the first plurality of net string holes, wherein each of the plurality of string hole walls is parallel to each of the respective string hole axes.

3. The lacrosse head of claim 1 wherein the first sidewall includes an interior sidewall surface and an exterior sidewall surface, wherein each string hole axis is offset at a third or a fourth non-perpendicular angle relative to at least one of the interior sidewall surface and the exterior sidewall surface.

4. The lacrosse head of claim 1 wherein the longitudinal axis of the lacrosse head bisects the lacrosse head into symmetric left and right sides, wherein the first non-perpendicular angle is 5° to 50°.

5. The lacrosse head of claim 4 wherein the first non-perpendicular angle is 25° to 45.

6. The lacrosse head of claim 5 wherein the first non-perpendicular angle is about 30°.

7. The lacrosse head of claim 1 comprising a second plurality of string holes having a plurality of respective string hole axes, wherein each of the string hole axes of the second plurality of string holes form a second non-perpendicular angle relative to the longitudinal axis of the lacrosse head that is not equal to the first non-perpendicular angle.

8. The lacrosse head of claim 1,
   wherein the lower rail includes an exterior surface having an exterior surface plane,
   wherein each string hole axis of each string hole of the first plurality of string holes is disposed to form a fourth non-perpendicular angle measured relative to the exterior surface plane.

9. The lacrosse head of claim 8 wherein the fourth non-perpendicular angle is less than or equal to the first non-perpendicular angle.

10. A lacrosse head comprising:
    a throat adapted for connection to a lacrosse handle;
    a base joined with the throat;
    a scoop distal from the base;
    a pair of sidewalls extending from the base and joined with one another distal from the base at the scoop, each sidewall defining a sidewall opening that is a non-string hole, each sidewall including an upper rail and a lower rail separated from one another by a distance, each sidewall including a cross member joined with the upper rail and the lower rail; and
    a longitudinal axis extending from the base toward the scoop;
    wherein each sidewall defines a plurality of string holes in at least one of the upper rail and the lower rail,
    wherein each of the plurality of string holes includes a respective string hole axis,
    wherein each string hole axis is disposed to form a first non-perpendicular angle measured relative to the longitudinal axis of the lacrosse head, the first non-perpendicular angle is 5° to 75°,
    wherein each sidewall opening includes a sidewall opening axis,
    wherein each sidewall opening axis is disposed to form a fifth non-perpendicular angle value measured relative to the longitudinal axis of the lacrosse head, the fifth non-perpendicular angle is 5° to 75°.

11. The lacrosse head of claim 10,
    wherein the lower rail includes an exterior surface having an exterior surface plane,
    wherein each string hole axis of each string hole of the first plurality of string holes is disposed to form a fourth non-perpendicular angle measured relative to the exterior surface plane.

12. The lacrosse head of claim 10, wherein the longitudinal axis of the lacrosse head bisects the lacrosse head into symmetric left and right sides, wherein the first non-perpendicular angle is 5° to 50°.

13. The lacrosse head of claim 12 wherein the first non-perpendicular angle is 25° to 45°.

14. The lacrosse head of claim 13 wherein the first non-perpendicular angle is about 30°.

15. The lacrosse head of claim 11 wherein the first non-perpendicular angle is equal to the fourth non-perpendicular angle.

16. A lacrosse head comprising:
    a throat adapted to connect to a lacrosse handle;
    a base joined with the throat, the base including a ball stop, the ball stop extending from an upper ball stop rim to a lower ball stop rim;
    a scoop distal from the base;
    a first sidewall and a second sidewall, each extending from the base toward the scoop and joined with one another distal from the base at the scoop, each of the first and second sidewall being of an open frame construction defining a sidewall opening, each of the first and second sidewall including an upper rail and a lower rail, and
    a longitudinal axis of the lacrosse head extending from the ball stop toward the scoop,
    wherein the lower rail defines a plurality of string holes, each string hole of the plurality of string holes having a string hole axis,
    wherein each string hole axis of each string hole of the plurality of string holes is disposed to form a first angle measured relative to the longitudinal axis of the lacrosse head, the first angle being a non-perpendicular angle relative to the longitudinal axis of the lacrosse head, the first angle being 5° to 75°,
    wherein the first sidewall and the second sidewall each include an interior sidewall surface and an exterior sidewall surface,
    wherein each string hole axis forms a third angle measured relative to the interior sidewall surface, the third angle being 15° to 85°, wherein each string hole axis forms a fourth angle measured relative to the exterior sidewall surface, the fourth angle being 5° to 75°.

17. The lacrosse head of claim 16, wherein the third and fourth angles are unequal.

18. The lacrosse head of claim 17, wherein the third and fourth angles each vary depending on a curvature of the first sidewall and the second sidewall outward, away from the longitudinal axis of the lacrosse head.

19. The lacrosse head of claim 16, wherein the third angle is less than the fourth angle.

20. The lacrosse head of claim 16,
wherein the third angle is non-perpendicular relative to the interior sidewall surface,
wherein the fourth angle is non-perpendicular to the exterior sidewall surface,
wherein the first angle is unequal to the third angle,
wherein the first angle is unequal to the fourth angle.

* * * * *